(12) United States Patent
Koschinat

(10) Patent No.: US 7,311,446 B2
(45) Date of Patent: Dec. 25, 2007

(54) SWIVEL BEARING AND A STEERING AXLE EQUIPPED THEREWITH

(75) Inventor: Hubert B. Koschinat, Hösbach (DE)

(73) Assignee: Otto Sauer Achsenfabrik GmbH, Bessenbach-Keilberg (DE)

( * ) Notice: Subject to any disclaimer, the term of this patent is extended or adjusted under 35 U.S.C. 154(b) by 17 days.

(21) Appl. No.: 10/515,592

(22) PCT Filed: Nov. 28, 2003

(86) PCT No.: PCT/EP03/13399

§ 371 (c)(1),
(2), (4) Date: Nov. 24, 2004

(87) PCT Pub. No.: WO2004/048180

PCT Pub. Date: Jun. 10, 2004

(65) Prior Publication Data

US 2005/0180670 A1    Aug. 18, 2005

(30) Foreign Application Priority Data

Nov. 28, 2002   (DE) .......................... 202 18 453 U
Mar. 14, 2003   (DE) .......................... 203 04 107 U

(51) Int. Cl.
*F16C 27/06* (2006.01)
(52) U.S. Cl. ......................... 384/221; 384/222
(58) Field of Classification Search ................ 384/202, 384/220, 221, 222
See application file for complete search history.

(56) References Cited

U.S. PATENT DOCUMENTS

| | | |
|---|---|---|
| 1,548,050 A | 8/1925 | Lord |
| 3,368,852 A | 2/1968 | Herbenar et al. |
| 3,441,288 A | 4/1969 | Boughner |
| 3,976,338 A * | 8/1976 | Trachte et al. .............. 384/220 |

FOREIGN PATENT DOCUMENTS

| | | |
|---|---|---|
| DE | 838 841 | 5/1952 |
| DE | 14 55 811 | 5/1969 |
| DE | 15 80 683 | 6/1970 |
| DE | 36 16 998 | 11/1987 |
| FR | 2 335 359 | 7/1977 |
| GB | 726 322 | 3/1955 |

* cited by examiner

*Primary Examiner*—Thomas R. Hannon
(74) *Attorney, Agent, or Firm*—Wenderoth, Lind & Ponack, L.L.P.

(57) ABSTRACT

The invention relates to a swivel bearing that is characterized by at least one elastic, radially prestressed bearing element, which closely encircles a rotation axis completely or at least in areas, is inserted into a bearing opening of a first bearing part, preferably pressed therein, and which is axially tensioned against at least one face of a second bearing part by means of a screw connection acting coaxial to the rotation axis. The invention also relates to a steering axle that is equipped with a swivel bearing of the aforementioned type.

19 Claims, 4 Drawing Sheets

SWIVEL BEARING AND A STEERING AXLE EQUIPPED THEREWITH

BACKGROUND OF THE INVENTION

The invention relates to a swivel bearing, which is especially suitable for use in steering axles, in particular trailing steering axles for motor vehicles, such as towing vehicles, trailers, semi-trailers or the like, and meets all desired requirements of damping and stabilization at low technical weight and cost expenditures and also can ensure the requisite reset forces in a durable and reliable manner.

BRIEF SUMMARY OF THE INVENTION

For this purpose, the invented swivel bearing is for example essentially distinguished in that at least one elastic radially prestressed bearing element is provided, closely encompassing, entirely or at least locally, a pivot axle. The bearing element is set, preferably forced, into a bearing opening of a first bearing part, and by means of a bolt connection (connecting element) acting coaxially to the pivot axle is clamped axially against at least one abutting face of a second bearing part. By disposing and implementing the elastic bearing element, the desired damping, stabilization and resetting properties can be reliably ensured.

It is advantageous if the bearing element is implemented as a bushing. For the sake of simplicity, the pivot axle can be formed by a threaded bolt of the bolt connection itself. To attain the desired functions, it is further proposed that the bearing element comprises a rubber-metal combination or consists of such.

In a preferred embodiment, the bearing element can comprise a tubular inner sleeve of metal, preferably steel, on the outer surface of which an elastic material, for example rubber, is applied. The bearing element is entirely or at least partially encompassed by an outer sleeve.

The outer sleeve can, in particular, be implemented as a thin-walled steel tube and be forced on with high prestress onto the elastic material, such that it [the elastic material] receives the requisite radial prestress. The outer sleeve can also be omitted since it is not required as a bearing face and the prestress of the elastic material can be generated in other ways, for example by forcing the bearing element into the bearing opening.

The prestressed elastic material can extend as an integral sleeve over substantially the entire length of the outer surface of the inner sleeve. But it also may be advantageous if further functions can be attained to have the prestressed elastic material extend as separate sleeves only over the two end regions of the outer surface of the inner sleeve. The sleeves can be formed by one or several rings, for example O rings.

In order to secure the elastic material such that it is axially nondisplaceable on the outer surface of the inner sleeve, a further embodiment of the invention can provide that the radially prestressed elastic material is received over a portion of its thickness in one or several circumferential groove(s) of the outer surface of the inner sleeve and projects over the adjacent region of the outer surface of the inner sleeve.

In order to limit the axial excursion of the elastic material outwardly, the ends of the outer sleeve can further be bent inwardly.

In the longitudinal region between the two sleeves provided in the end regions of the inner sleeve of prestressed elastic material, preferably between the outer surface of the inner sleeve and the inner surface of the outer sleeve, in a further preferred embodiment of the inventive concept at least one permanently lubricated slide bearing or a roller bearing (needle bearing) is provided. Through the combination of slide bearing or roller bearing, respectively with the elastic material, not only the desired damping and stabilization properties are attained, but the radial loading can also be absorbed without the swivel bearing elastically yielding radially.

There is also the possibility that a sleeve of prestressed elastic material is provided on one half of the outer surface of the inner sleeve, and on the other half a slide bearing or roller bearing (needle bearing) is provided between outer surface of the inner sleeve and inner surface of the outer sleeve. This implementation can be equipped with a relubrication device for the roller bearing.

At the end associated with the roller bearing of the bearing element, a sealing, preferably a radial shaft sealing, can be provided in order to close off the roller bearing toward the outside. For this case it is also useful to construct said sealing such that it opens under internal pressure; thus, during relubrication the lubricant can specifically exude at this site and no dirt can penetrate into the bearing arrangement.

In all previously discussed embodiments of the swivel bearing, it is advantageous if the elastic material is radially prestressed so that the provided swivel angle between the two bearing parts is attained through its elasticity alone and, when the torsion forces are removed, they automatically return to their starting position. Such an embodiment is especially suitable for use in steering axles.

It can moreover be provided that only after exceeding a specified swivel angle does the elastic material slip through on the inside with respect to the inner sleeve or on the outside with respect to the outer sleeve. For this purpose the elastic material can be secured against clipping through the inner sleeve and/or the outer sleeve through adhesion, vulcanization and/or form fitting.

The invention also relates to a steering axle, in particular trailing steering axles, for motor vehicles such as towing vehicles, trailers, semi-trailers or the like, to whose axle beam the wheels are articulated by means of steering forks connected to one another with a tie rod, with a swivel bearing provided between the axle beam and the wheels or the steering forks and the tie rod, respectively.

Such steering axles are known per se (cf. DE 19 45 589 A1, DE 44 05 325 C1 and DE 197 16 150 A1). The stabilization systems provided are intended to prevent shimmy movements of the wheels when driving in a straight line, steer through a fish-tail effect, dampen the steering movement during curve driving and support the back-steering force. The functions "stabilizing" and "damping" are fulfilled in known trailing steering axles only with considerable technical complexity: The damping of deflection or steering movements takes place virtually exclusively via hydraulic steering dampers or gas pressurized dampers, which most often are secured on the axle beam and on the tie rod and, consequently, during the steering movements are retracted and extended. For stabilization, i.e. avoidance of shimmy movements of the steered wheels when driving straight, up to this time further mechanical complexity had been required, such as for example stabilization devices pressurized with compressed air, such as are disclosed inter alia in DE 1 945 589 A1 and DE 73 38 796 U, or for example purely mechanical devices according to DE 44 05 325 C1 and DE 197 16 150 A1. Such damping and stabilization systems in general meet the requirements made of general driving practice. However, due to the high technical complexity, they can exhibit distinctive features, which become apparent for example during a steering-in of the axle, taking place too late or not at all with light and unloaded motor vehicles or in undesirable swerving of the rear end of the vehicle with full loading and especially short motor vehicles on curvy roads and under hard driving habits.

Steering axles, in particular motor vehicle front axles or force-steered axles in semitrailers, must allow steering without great resistance. For this purpose occasionally great technical complexity is exercised, up to needle-bearing support steering bolts. In trailing steering axles in previous design engineering, ease of steering movement is also attained by way of complex bearing bushings, which run on hardened steering swivel bolts. Since steering movements on trailing steering axles can only be effected due to transverse forces in connection with at least one rigid leading axle, and guiding steering linkage, etc. are not available, these must be made again quasi "controlled stiffly" with the aid of considerable additional complexity, namely with damping and stabilization devices, in order to fulfill the described functions.

The aim of the present invention is therefore also to propose a steering axle, while avoiding the disadvantages described in conjunction with prior art, which, with low technical, weight and cost expenditures, fulfills durably and reliably all requirements of damping and stabilizing required at such steering axle.

This problem is solved with a steering axle of the previously cited type according to the invention wherein the swivel bearing is such of the previously described type, the axle beam and the steering forks or the tie rod and the steering forks, respectively, forming in each instance the first and second bearing part, respectively. With such a stabilization and damping system, good and secure driving behavior is attained with low fabrication and cost expenditures.

The swivel bearing between the steering forks and the tie rod assists through its damping the stabilization through the swivel bearing between axle beam and steering forks. The sum of all spring rates involved in the torsion lead to the desired back-steering effect.

A further embodiment of the inventive concept determining the steering axle provides that, between an abutting face of the axle fist of the axle beam and a staying face of a recess of the bearing fork receiving the axle fist, a pair of undulated washers retained to one another with undulated contact faces facing one another under axial stress is disposed. One undulated washer is connected torsion-tight with the axle fist and the other undulated washer torsion-tight with the steering fork and, when driving straight, the two undulated washers, preferably over the entire surface or substantially over the entire surface, are in contact on one another and form a latching position. When torsioning the undulated washers against one another, locally gaps are formed between them and the areas of the undulated contact faces in contact with one another decrease with increasing steering angle.

In the latching position of the undulated washers, during fast straight driving shimmy movements of the wheels, which can occur through weight imbalancing and/or street unevenness, are prevented. During the steering process, both undulated washers move against one another such that the tangential regions of the contact faces increase or decrease in size depending on the steering angle. With increasing steering angle the motor vehicle is raised according to the oblique planes of the undulated washers and simultaneously the elastic material is deformed in the one or more bearing elements. Through the spring rates of the elastic material an assistance of the back-steering force occurs, which is greater the greater the steering angle. The use of undulated washers is known per se (cf. DE 36 16 998 A1). However, the intent has only been to utilize the undulated washers as pressure washers in connection with one helical spring each for stabilizing the straight-ahead driving. However, no steering angle-dependent back-steering force occurs in that case and the conventional complexity of bushing-supported and hardened steering swivel bolts is absolutely required.

Further goals, characteristics, advantages and applications of the invention are evident in the following description of embodiment examples in conjunction with the drawings. All described and/or graphically represented characteristics by themselves or in any combination form the subject matter of the invention, even independently of their summary in individual claims or their reference back.

DETAILED DESCRIPTION OF THE INVENTION

The invention will first be explained in further detail by example of a first embodiment of a swivel bearing 1 according to the invention utilized in a trailing steering axle of a motor vehicle.

Figure 1:
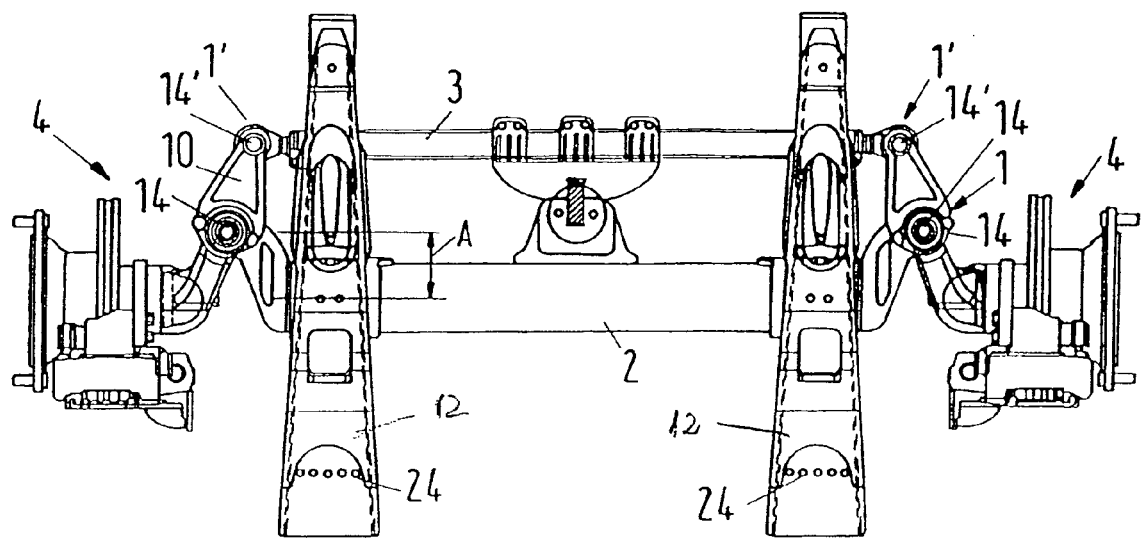
FIG. 1 a trailing steering axle comprising the invention with radius arm for air suspension in top view during straight driving, FIG. 2 the trailing steering axle according to FIG. 1 in top view with the wheels steered in, FIG. 3 a vertical section through a steering fork bearing arrangement and tie rod bearing arrangement, FIG. 3A top view onto the configuration according to FIG. 3, FIG. 4A an undulated washer pair according to the invention in straight-driving position, FIG. 4B the undulated washer pair according to FIG. 4A in the state of the steered-in wheels, as well as FIGS. 5 and 6 two further embodiments of a swivel bearing according to the invention.
Figure 2:
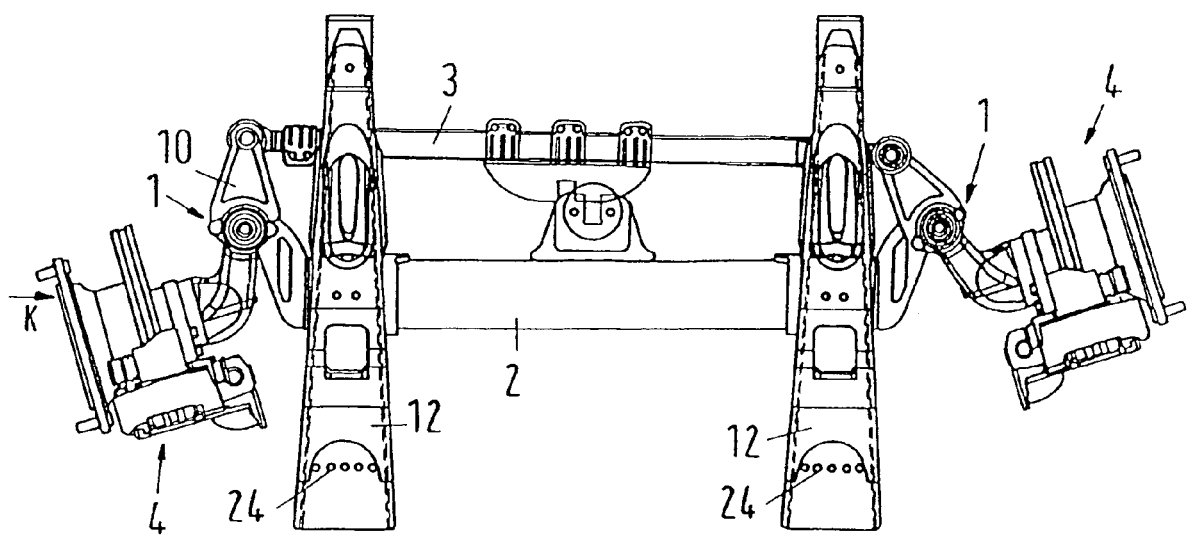

The steering axle depicted in FIGS. 1 and 2 and developed as a trailing steering axle has an axle beam 2 disposed on two radius arms 12, disposed at a spacing from one another and joined at their respective front ends to the motor vehicle chassis, for example by a metal plate, and having at their rear end holes, for example for receiving air spring elements. The axle beam 2, for example tightly clamped or welded, serves as the stationary bearing part, at whose outer ends, cranked in the driving direction, one steering fork 10 each is articulated as the moving bearing part. The radius arm 12 can also be replaced by conventional spring guides or leaf springs. The pivot axle 14, formed by the threaded bolt of a bolt connection (connecting element) 6, of the swivel bearing are located at distance A in the driving direction in front of the axle center. A tie rod 3 ensures the tracking fidelity of the wheels 4, in that the ends of the steering fork 10 opposite to the wheels 4 are connected via swivel bearing 1 with the outer end of the tie rod 3. The trailing steering axle has no mechanical steering transmissions such as rod arrangements, cable linkages, hydraulic cylinders, etc. The steering action takes place exclusively via the side forces K between tires and street occurring during curve driving. They must therefore run jointly with at least one rigid leading axle, which can be disposed in front of it or behind.

Figure 3:
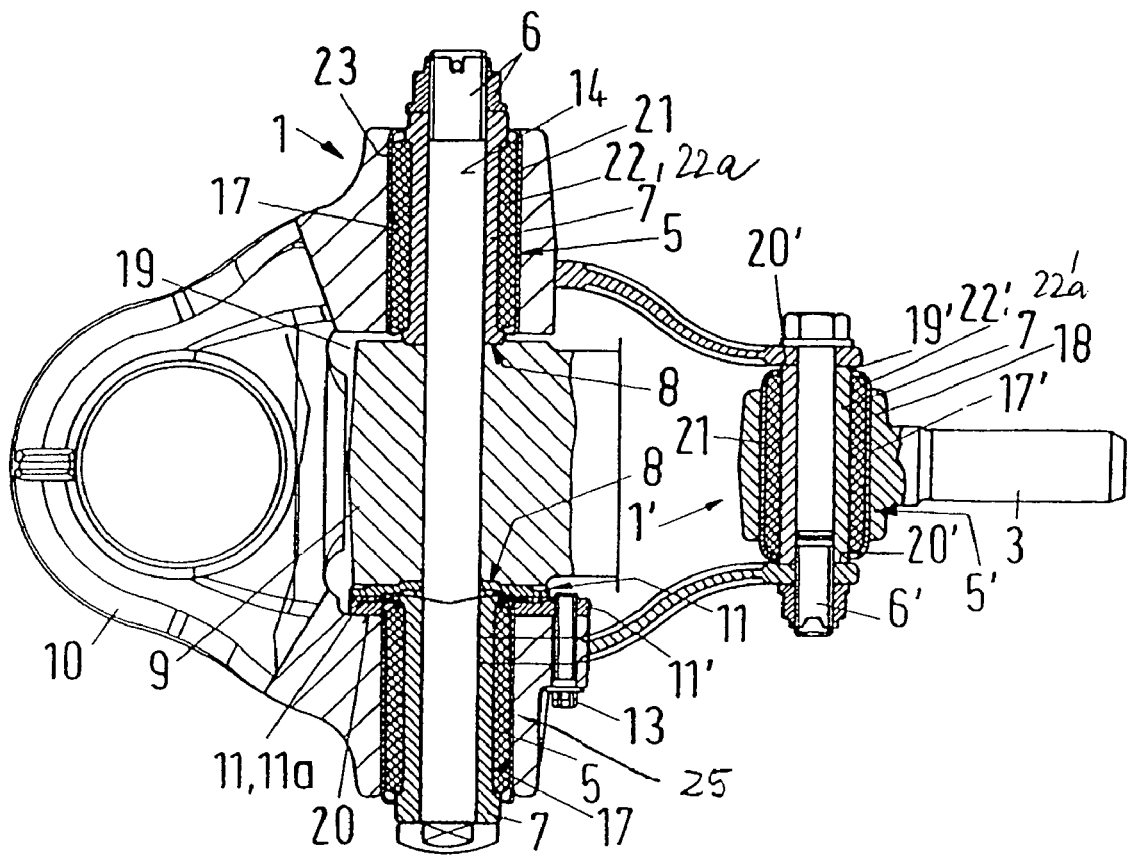
Figure 3A:
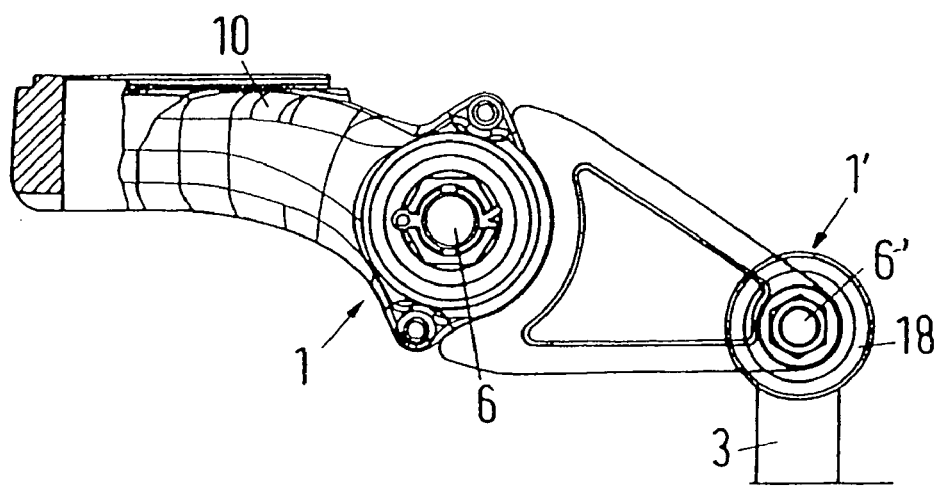

In FIGS. 3 and 3A is illustrated the functional principle of the steering axle according to the invention and the swivel bearing 1 set between axle beam 2 and steering fork 10. Instead of conventional hardened steering swivel bolts, which are bushing or needle supported, to develop a swivel bearing 1 between axle beam 2 and steering fork 10 serving for stabilization and damping, elastic bearing elements 5 encompassing the particular pivot axle 14 of the swivel bearing 1 are provided and specifically in the depicted embodiment example within bearing openings 17 of the steering fork 10 above and beneath the axle fist 9 of the axle beam 2 penetrated by the pivot axle 14.

The bearing elements 5 comprise a tubular rigid inner sleeve 7, preferably made of steel, which on its outer circumferential surface bears an elastic material 22, such as a rubber mixture, applied as a bushing. The elastic material 22 is encompassed by an outer sleeve 21 of a thin-walled steel tube, which is forced with high prestress onto the shell of elastic material 22 in order to attain high loading capacity.

In order for the elastic material 22, on the one hand, not to swell out at the ends at a high radial loading, but, on the other hand, a material layer to be available of sufficient thickness and elasticity for the degree of deformation occurring during driving operation, in the depicted embodiment the ends of the inner sleeve 7 are thickened toward the inside, in that for example a thick-walled tube with the exception of the ends is turned narrower with the formation of a circumferential groove 25. For this purpose the ends of the outer sleeve 21 can also be bent inwardly, in order to enclose the elastic material 22 also at the abutting side.

The bearing elements 5 are each pressed into their bearing openings 17. The inner sleeves 7 of the bearing elements 5 are clamped axially against an abutting face 8 of the axle fist 9 by means of a bolt connection 6, which penetrates with a threaded bolt forming the pivot axle 14 the bearing openings 17 of the steering fork 10 as well as also the axle fist 9 of the axle beam 2. The bushing-like bearing element 5, which is formed of the described rubber-metal combination, is adaptingly received on the threaded bolt of the bolt connection 6 forming the pivot axle 14. In this way the bearing elements 5 fulfill the functions of the articulated bearing arrangement between stationary axle beam 2 and movable steering fork 10 as well as of the damping of the steering movement as well as the assistance of the back-steering force, and therewith the stabilization. Consequently it forms a significant component of a swivel bearing 1, which can be utilized in other ways with advantage, and thus not only on a steering axle of a motor vehicle.

The stationary axle fist 9 is received in a recess 19 of the movable steering fork 10. Between the lower abutting face 8 of the axle fist 9 and a staying face 20 opposite to it of the recess 19, in a special embodiment of the swivel bearing 1 a pair of undulated washers 11, 11a can be positioned in order to form a back-steering device. The lower undulated washer 11a is secured torsion-tight on the steering fork 10 via at least one securing element 13. The upper undulated washer 11 is positioned between the inner sleeve 7 of the lower bearing element 5 and the lower abutting face 8 of the axle fist 9 and is secured torsion-tight on the axle fist 9.

Figure 4A:
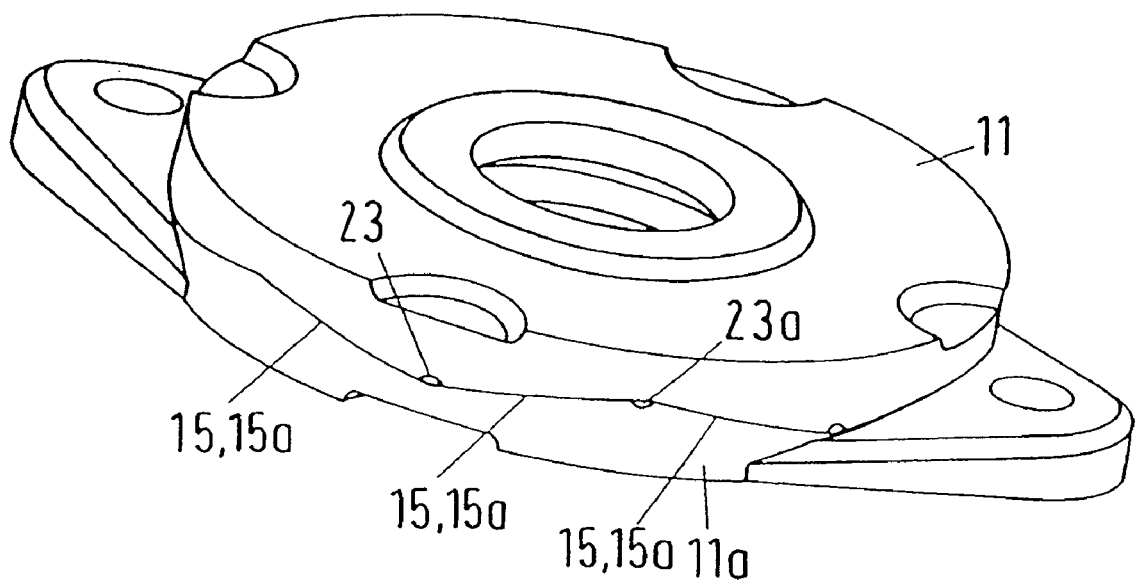
Figure 4B:
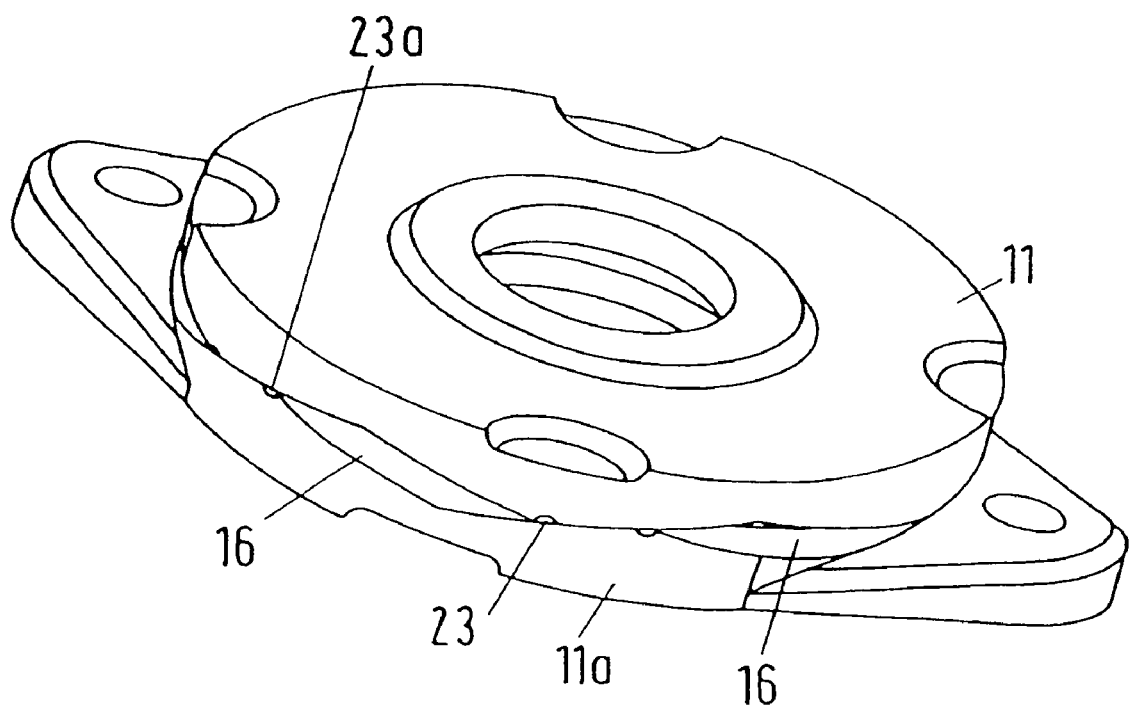

As is especially evident in FIGS. 4A and 4B, the undulated washers 11, 11a have undulated contact faces 15, 15a facing one another, which ine straight-ahead driving are in contact with one another over a maximum area and form a latching position. The latching position prevents, during fast straight-ahead driving, shimmy movements of the wheels which can occur due to weight imbalancing and/or unevenness of the road. During the steering process the undulated washers 11, 11a turn against one another, such that locally gaps 16 are formed and the area in which the undulated contact faces 15, 15a are in contact with one another decreases with increasing steering angle. In this way, with increasing steering angle the motor vehicle is raised according to the cooperating inclined surfaces of the undulated contact faces 15, 15a and simultaneously the elastic bearing element 5 is deformed. Through the spring rate of the bearing elements 5 a back-steering assistance is generated, which is greater the greater the steering angle. The particular undulation peaks of the undulated washers 11, 11a with the formation of radial grooves 23, 23a are developed to receive lubricant. The grooves 23, 23a can also absorb possibly occurring abrasions of the undulated contact faces 15, 15a. Furthermore, the undulated contact faces 15, 15a can be protected through (not shown) elastic sealing collars against external dirt effects and/or splashed water. Both measures serve to increase the service life.

In the depicted embodiment, the particular steering connections of the tie rod ends 18 with the steering fork 10 are developed as swivel bearing 1' according to the invention with damping and stabilization properties. For this purpose, at least one elastic bearing element 5' encompassing the associated pivot axle 14' of swivel bearing 1' is provided, which is set into, preferably pressed into, a bearing opening 17' of the steering fork 10. By means of a bolt connection 6' coaxial with the pivot axle 14', whose threaded bolt forms the pivot axle 14', an elastic bearing element 5 is clamped radially against the inner surface of the bearing opening 17' and axially against staying faces 20' opposing one another a recess 19' of the steering fork 10. The bearing element 5' comprises an inner sleeve 7', into which is fitted the threaded bolt of the bolt connection 6'. The bearing element 5' developed like a bushing is formed like the bearing element 5 of a rubber metal combination, in that onto the inner sleeve 7' an elastic material 22' is applied and on the latter a thin-walled outer sleeve 21' of steel is pressed. This swivel bearing 1' assists as a damping device the stabilization provided in the swivel bearing 1 between axle beam 2 and steering fork 10. Independent of the embodiment of the tie rod bearing arrangement, the sum of all spring rates involved in the torsion leads to the desired back-steering effect.

Figure 5:
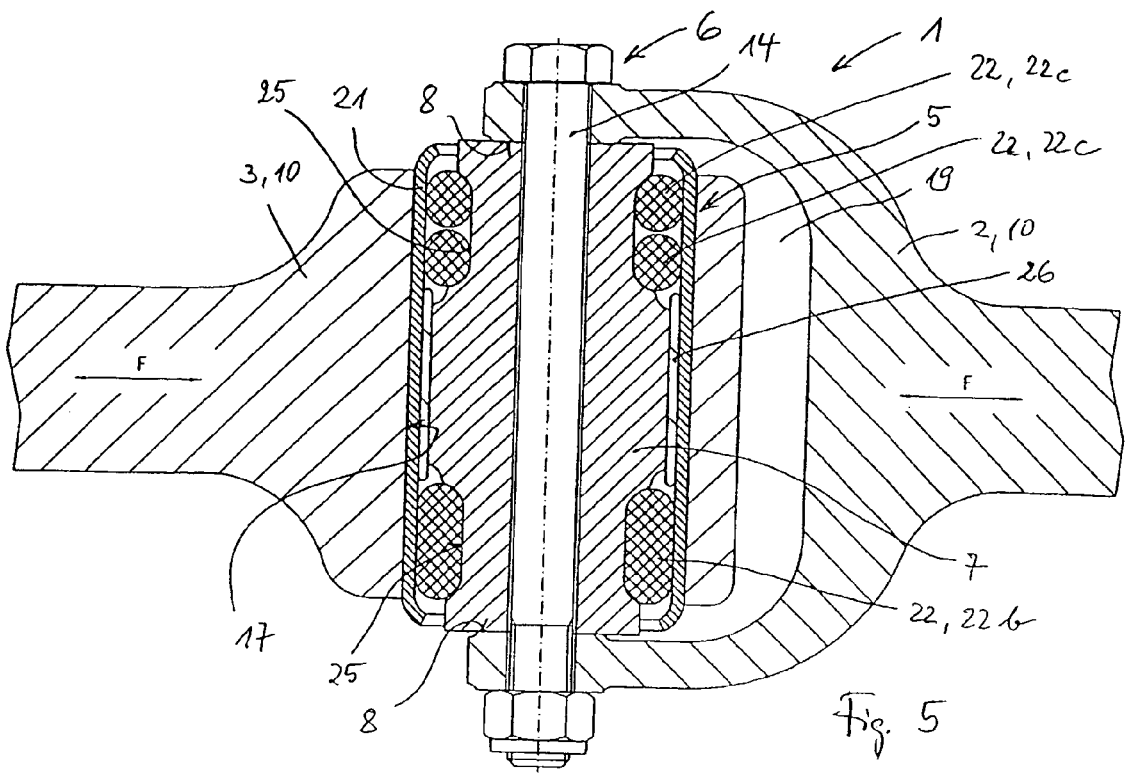
Figure 6:
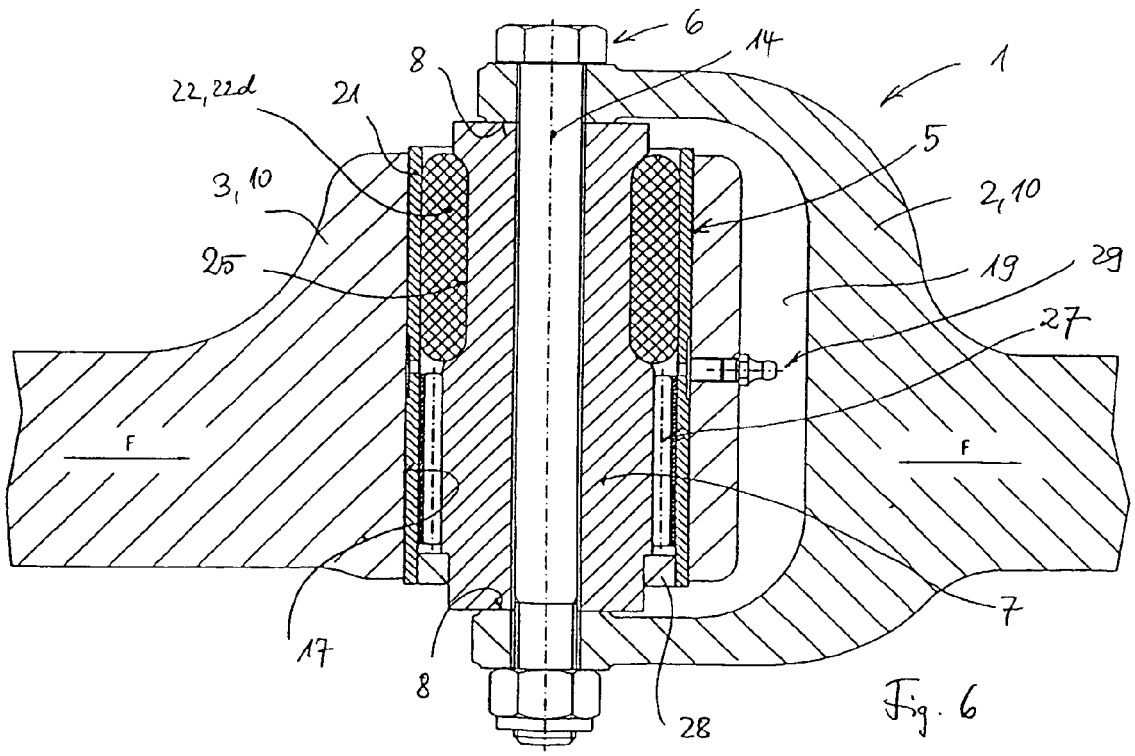

In FIGS. 5 and 6 two additional embodiments of a swivel bearing 1 according to the present invention are depicted, which preferably could be used in steering axles of the previously described type, but are generally applicable as a structural element.

In the maintenance-free swivel bearing 1 according to FIG. 5, the bearing element 5 is closed at both ends via radially prestressed elastic sleeves 22b, 22c. The elastic sleeves 22b, 22c can be comprised of one or several individual elements, for example large-volume O-rings 22c. Between the two radially prestressed elastic elements 22b and 22c, a permanently lubricated slide bearing 26 is disposed in the interspace between the outer face of the inner sleeve 7 and the inner surface of the outer sleeve 21.

The force attack F in the direction of radial loading is depicted centrally with respect to the swivel bearing 1.

In the variant of a swivel bearing 1 according to the invention depicted in FIG. 6, a radially prestressed elastic element 22, 22d is provided adjacent to a radial bearing 27, developed as roller bearing, on the outer surface of the inner sleeve 7 only at one side and on the other end a sealing 28, for example a commercially available radial shaft sealing ring. This embodiment can be equipped with a relubrication device 29, the sealing 28 usefully being developed as a sealing ring opening toward the outside under internal pressure, such that, on the one hand, during relubrication the lubricant can exude specifically at this site and, on the other hand, no dirt penetrates into the bearing arrangement. In place of the depicted roller bearing 28, here also a slide bearing 26 can be used.

The elastic elements 22, 22a to 22d, are prestressed in all variants such that the particular swivel angle provided for the application purpose is attained through its elasticity alone without a sliding movement between the elastic material and the inner sleeve 7 or the outer sleeve 21 taking place and that through this property the swivel bearing 1 is reset automatically into its starting position when the torsion forces are removed. This can structurally also be implemented such that only after a swivel angle is exceeded do the elastic elements 22 slip through on the inside or the outside such that they do not tear off on the inside, but with the consequence that the pivoting parts no longer spring back completely into the starting position. In order to avoid the premature slipping-through, the elastic material can additionally be connected either with the inner sleeve or with the outer sleeve fixedly or via form fit (for example via teeth or via holes in the metal parts) through adhesion or vulcanization.

In the variants depicted in FIGS. 5 and 6, which can be applied instead of the swivel bearings 1, 1' in FIGS. 1 to 3A, the combination of a radial bearing with an elastically resilient material is essential. This fulfills the function of being radially loadable without radially yielding elastically and the two pivoting parts (for example fist and fork) being swivellable in time up to the swivel angle provided in each instance for the application purpose and, when the swivel force is removed, the articulation parts spring back into the starting position. An intended nondestructive slipping-through is therein advantageous after a specific swivel angle has been exceeded.

LIST OF REFERENCE SYMBOLS 1, 1' Stabilization and swivel bearing (as part of a damping device)
2 Bearing part (axle beam)
3 Bearing part (tie rod)
4 Wheels
5, 5' Bearing elements
6, 6' Connecting elements
7, 7' Inner sleeves
8 Abutting face
9 Axle fist
10 Bearing part (steering forks)
11, 11a Undulated washers
12 Radius arm
13 Securing element
14, 14' Pivot axles
15, 15a undulated contact faces
16 Gap
17, 17' Bearing openings
18 Tie rod ends
19, 19' Recesses
20, 20' Staying faces
21, 21' Outer sleeves
22, 22' Elastic material
22a, 22a'
22b, 22c
22d Sleeves or rings
23, 23' Grooves
24 Holes
25 Circumferential grooves
26 Slide bearing
27 Roller bearing
28 Sealing (radial shaft sealing)
29 Relubrication device
A Distance
F Force attack
K Side forces

The invention claimed is:

1. A bearing device comprising:
a first bearing part having a bearing opening therein;
a second bearing part;
a swivel bearing set in said bearing opening, said swivel bearing including:
a pivot axle having a longitudinal axis;
an elastic, radially prestressed bearing element encompassing at least a part of said pivot axle;
a metal outer sleeve encompassing said bearing element, disposed to exert a radial prestress on said bearing element, said outer sleeve being encompassed by and directly contacting said first bearing part; and
a connecting element for joining said first bearing part and said second bearing part, said connecting element having a longitudinal axis coaxial with said longitudinal axis of said pivot axle, said connecting element including a threaded bolt, and said bolt forms said pivot axle.

2. The bearing device of claim 1, wherein said bearing element is operable to:
elastically bias said first bearing part and said second bearing part toward a starting position; and
elastically allow a specified swivel angle between said first bearing part and said second bearing part under torsion.

3. The bearing device of claim 1, wherein said bearing element is ring-shaped.

4. The bearing device of claim 1, wherein said bearing element comprises
a first elastic, radially prestressed bearing element encompassing at least a part of said pivot axle, located at a first side of said first bearing part;
further comprising a second elastic, radially prestressed bearing element encompassing at least a part of said pivot axle, located at a second side of said first bearing part such that said first bearing part is located between said first bearing element and said second bearing element.

5. The bearing device of claim 4, wherein said swivel bearing further includes a metal, tubular inner sleeve having an outer surface, located between said pivot axle and said first bearing element, and located between said pivot axle and said second bearing element.

6. The bearing device of claim 5, wherein said outer surface of said inner sleeve of said swivel bearing further includes a circumferential groove receiving said first bearing element or said second bearing element.

7. The bearing device of claim 6, wherein said swivel bearing further includes a permanently lubricated slide bearing, roller bearing or needle bearing disposed between said inner sleeve and said outer sleeve.

8. The bearing device of claim 4, wherein said first bearing element or said second bearing element is operable to elastically:
bias said first bearing part and said second bearing part toward a starting position; and
allow a specified swivel angle between said first bearing part and said second bearing part under torsion.

9. The bearing device of claim 4, wherein said connecting element includes a threaded bolt, and said bolt forms said pivot axle.

10. The bearing device of claim 1, wherein said swivel bearing comprises a
 a first swivel bearing to be set in an opening of an axle beam, wherein:
  said pivot axle comprises a first pivot axle having a first longitudinal axis;
  said bearing element comprises a first elastic, radially prestressed bearing element encompassing at least a part of said first pivot axle;
  said metal outer sleeve encompasses said first bearing element, disposed to exert a radial prestress on said first bearing element, said outer sleeve to be encompassed by and to directly contact the axle beam; and
  said connecting element comprises a first connecting element for joining said axle beam and said steering fork, said first connecting element having a longitudinal axis coaxial with said first longitudinal axis;
further comprising:
 a second swivel bearing to be set in an opening of a tie rod, said second swivel bearing including:
  a second pivot axle having a second longitudinal axis;
  a second elastic, radially prestressed bearing element encompassing at least a part of said second pivot axle, located at a first side of the tie rod;
  a third elastic, radially prestressed bearing element encompassing at least a part of said second pivot axle, to be located at a second side of the tie rod such that the tie rod is located between said second bearing element and said third bearing element; and
  a second connecting element for joining the tie rod and the steering fork, said second connecting element having a longitudinal axis coaxial with said second longitudinal axis.

11. The bearing device of claim 10, further comprising a pair of washers, each washer of said pair having an undulated contact face which faces an undulated contact face of another washer of said pair;
 wherein the steering fork further includes a recess for receiving the axle beam and a staying face therein, and a first washer of said pair is irrotatably fixed to the staying face;
 wherein a second washer of said pair is irrotatably fixed to the axle beam;
 wherein said pair of washers is operable to form a latched position, in which said first washer and said second washer are held against each other with substantially an entirety of said undulated contact faces contacting each other;
 wherein said first washer of said pair is rotatable with respect to said second washer of said pair; and
 wherein said pair of washers is operable to decrease an area of said undulated contact faces in contact with one another when a rotation angle between said first washer and said second washer is increased.

12. A bearing device comprising:
 a first bearing part having a bearing opening therein:
 a second bearing part;
 a swivel bearing set in said bearing opening said swivel bearing including:
  a pivot axle having a longitudinal axis:
  an elastic, radially prestressed bearing element encompassing at least a part of said pivot axle;
  a metal outer sleeve encompassing said bearing element disposed to exert a radial prestress on said bearing element, said outer sleeve being encompassed by and directly contacting said first bearing part; and
  a connecting element for joining said first bearing part and said second bearing part, said connecting element having a longitudinal axis coaxial with said longitudinal axis of said pivot axle;
 wherein said swivel bearing further includes a metal, tubular inner sleeve, having an outer surface, disposed between said pivot axle and said bearing element, and
 wherein said bearing element is applied to said outer surface of said inner sleeve.

13. The bearing device of claim 12, wherein said bearing element extends as a sleeve over substantially an entire length of said outer surface of said inner sleeve.

14. The bearing device of claim 12, wherein said bearing element is secured to said inner sleeve and/or said outer sleeve by adhesion, vulcanization and/or form fit.

15. The bearing device of claim 12, wherein said swivel bearing further includes a permanently lubricated slide bearing, roller bearing or needle bearing disposed between said inner sleeve and said outer sleeve.

16. The bearing device of claim 12, wherein said swivel bearing further includes:
 a roller bearing or needle bearing disposed between said inner sleeve and said outer sleeve; and
 a seal disposed to seal an end of said roller bearing or needle bearing.

17. The bearing device of claim 16, wherein said seal is operable to open to an exterior of said swivel bearing under internal pressure.

18. The bearing device of claim 12, wherein said swivel bearing further includes:
 a roller bearing or needle bearing disposed between said inner sleeve and said outer sleeve; and
 a device for relubricating said roller bearing or needle bearing.

19. The bearing device of claim 12, wherein said outer surface of said inner sleeve of said swivel bearing further includes a circumferential groove receiving said bearing element.

* * * * *